(12) United States Patent
Brookins et al.

(10) Patent No.: US 8,880,633 B2
(45) Date of Patent: Nov. 4, 2014

(54) PROXY SERVER WITH BYTE-BASED INCLUDE INTERPRETER

(75) Inventors: Nicholas S. Brookins, San Diego, CA (US); Akinwale O. Olugbile, San Diego, CA (US); Ronnie So, Foster City, CA (US); Stephen L. Ludin, Mill Valley, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 1 day.

(21) Appl. No.: 13/329,081

(22) Filed: Dec. 16, 2011

(65) Prior Publication Data

US 2012/0259942 A1    Oct. 11, 2012

Related U.S. Application Data

(60) Provisional application No. 61/424,092, filed on Dec. 17, 2010, provisional application No. 61/424,482, filed on Dec. 17, 2010, provisional application No. 61/424,112, filed on Dec. 17, 2010, provisional application No. 61/555,378, filed on Nov. 3, 2011.

(51) Int. Cl.
| | |
|---|---|
| *G06F 15/167* | (2006.01) |
| *H04L 29/08* | (2006.01) |
| *G06F 17/30* | (2006.01) |
| *H04L 12/811* | (2013.01) |

(52) U.S. Cl.
CPC ............... *H04L 67/28* (2013.01); *H04L 67/32* (2013.01); *H04L 67/02* (2013.01); *G06F 17/30* (2013.01); *H04L 47/38* (2013.01)
USPC ........... 709/213; 709/217; 709/219; 709/231; 713/176

(58) Field of Classification Search
USPC ............... 709/213, 217, 219, 231; 713/176
See application file for complete search history.

(56) References Cited

U.S. PATENT DOCUMENTS

| | | |
|---|---|---|
| 5,138,697 A | 8/1992 | Yamamoto et al. |
| 5,881,245 A | 3/1999 | Thompson |

(Continued)

FOREIGN PATENT DOCUMENTS

| | | |
|---|---|---|
| EP | 1091536 | 4/2001 |
| KR | 2008-0003961 | 1/2008 |

(Continued)

OTHER PUBLICATIONS

U.S. Appl. No. 12/981,676.

(Continued)

*Primary Examiner* — Thanh Tammy Nguyen
*Assistant Examiner* — Jonathan Bui
(74) *Attorney, Agent, or Firm* — Joshua T. Matt

(57) ABSTRACT

According to this disclosure, a proxy server is enhanced to be able to interpret instructions that specify how to modify an input object to create an output object to serve to a requesting client. Typically the instructions operate on binary data. For example, the instructions can be interpreted in a byte-based interpreter that directs the proxy as to what order, and from which source, to fill an output buffer that is served to the client. The instructions specify what changes to make to a generic input file. This functionality extends the capability of the proxy server in an open-ended fashion and enables it to efficiently create a wide variety of outputs for a given generic input file. The generic input file and/or the instructions may be cached at the proxy. The teachings hereof have applications in, among other things, the delivery of web content, streaming media, and the like.

20 Claims, 4 Drawing Sheets

(56) References Cited

U.S. PATENT DOCUMENTS

| | | | |
|---|---|---|---|
| 6,108,703 A | 8/2000 | Leighton et al. | |
| 6,141,753 A | 10/2000 | Zhao et al. | |
| 6,430,624 B1 | 8/2002 | Jamtgaard et al. | |
| 6,484,199 B2 | 11/2002 | Eyal | |
| 6,665,726 B1 | 12/2003 | Leighton et al. | |
| 6,680,740 B2 | 1/2004 | Krueger | |
| 6,751,673 B2 | 6/2004 | Shaw | |
| 6,801,927 B1 | 10/2004 | Smith et al. | |
| 6,892,240 B1 | 5/2005 | Nakajima | |
| 6,989,868 B2 | 1/2006 | Masukura et al. | |
| 7,111,057 B1 | 9/2006 | Sherman et al. | |
| 7,127,713 B2 | 10/2006 | Davis et al. | |
| 7,200,681 B1 | 4/2007 | Lewin et al. | |
| 7,240,100 B1 | 7/2007 | Wein et al. | |
| 7,293,093 B2 | 11/2007 | Leighton et al. | |
| 7,296,082 B2 | 11/2007 | Leighton et al. | |
| 7,339,993 B1 | 3/2008 | Brooks et al. | |
| 7,340,764 B2 | 3/2008 | Kubota et al. | |
| 7,376,716 B2 | 5/2008 | Dilley et al. | |
| 7,471,722 B2 | 12/2008 | Tahira et al. | |
| 7,472,178 B2 | 12/2008 | Lisiecki et al. | |
| 7,508,447 B2 | 3/2009 | Tappermann et al. | |
| 7,552,338 B1* | 6/2009 | Swildens et al. | 713/176 |
| 7,644,175 B2 | 1/2010 | Klemets | |
| 7,665,115 B2 | 2/2010 | Gallo et al. | |
| 7,752,258 B2 | 7/2010 | Lewin et al. | |
| 7,895,616 B2 | 2/2011 | Unger | |
| 7,925,774 B2 | 4/2011 | Zhang et al. | |
| 7,969,333 B2 | 6/2011 | Normile et al. | |
| 8,271,793 B2* | 9/2012 | Swildens et al. | 713/176 |
| 8,344,917 B2 | 1/2013 | Misra et al. | |
| 8,542,748 B2 | 9/2013 | Zhao et al. | |
| 8,681,856 B2 | 3/2014 | Bae | |
| 2002/0046273 A1 | 4/2002 | Lahr et al. | |
| 2002/0124098 A1 | 9/2002 | Shaw | |
| 2002/0180755 A1 | 12/2002 | Krueger | |
| 2003/0041095 A1 | 2/2003 | Konda et al. | |
| 2003/0187935 A1 | 10/2003 | Agarwalla et al. | |
| 2004/0049598 A1 | 3/2004 | Tucker et al. | |
| 2004/0098344 A1 | 5/2004 | Nakanishi et al. | |
| 2004/0231004 A1 | 11/2004 | Seo | |
| 2005/0091399 A1 | 4/2005 | Candan et al. | |
| 2005/0144165 A1 | 6/2005 | Hafizullah et al. | |
| 2005/0226324 A1 | 10/2005 | Ouyang et al. | |
| 2005/0229231 A1 | 10/2005 | Lippincott | |
| 2005/0262257 A1 | 11/2005 | Major et al. | |
| 2006/0029128 A1 | 2/2006 | Tahira et al. | |
| 2006/0061600 A1 | 3/2006 | Beuker et al. | |
| 2006/0242155 A1 | 10/2006 | Moore et al. | |
| 2007/0022215 A1 | 1/2007 | Singer et al. | |
| 2007/0230568 A1 | 10/2007 | Eleftheriadis et al. | |
| 2008/0005246 A1 | 1/2008 | VanBuskirk et al. | |
| 2008/0008246 A1 | 1/2008 | Mukherjee et al. | |
| 2008/0181298 A1 | 7/2008 | Shi et al. | |
| 2008/0195698 A1 | 8/2008 | Stefanovic et al. | |
| 2008/0212683 A1 | 9/2008 | Nakata et al. | |
| 2009/0106288 A1 | 4/2009 | Yang et al. | |
| 2009/0106356 A1 | 4/2009 | Brase et al. | |
| 2009/0119580 A1 | 5/2009 | Rohrabaugh et al. | |
| 2009/0178022 A1* | 7/2009 | Horne et al. | 717/106 |
| 2009/0259853 A1* | 10/2009 | Swildens et al. | 713/176 |
| 2009/0297123 A1 | 12/2009 | Virdi et al. | |
| 2010/0150395 A1* | 6/2010 | Davis et al. | 382/100 |
| 2010/0180011 A1 | 7/2010 | Sood et al. | |
| 2010/0185306 A1* | 7/2010 | Rhoads | 700/94 |
| 2010/0232516 A1 | 9/2010 | Tojima et al. | |
| 2010/0235472 A1 | 9/2010 | Sood et al. | |
| 2010/0235528 A1 | 9/2010 | Bocharov et al. | |
| 2011/0022471 A1 | 1/2011 | Brueck et al. | |
| 2011/0022846 A1* | 1/2011 | Ginter et al. | 713/176 |
| 2011/0080940 A1 | 4/2011 | Bocharov et al. | |
| 2011/0083037 A1 | 4/2011 | Bocharov et al. | |
| 2011/0106847 A1 | 5/2011 | Bocharov et al. | |
| 2011/0173345 A1 | 7/2011 | Knox et al. | |
| 2011/0176060 A1* | 7/2011 | Lee et al. | 348/723 |
| 2011/0246782 A1* | 10/2011 | MacKay et al. | 713/182 |
| 2011/0296048 A1 | 12/2011 | Knox et al. | |
| 2012/0265853 A1 | 10/2012 | Knox et al. | |

FOREIGN PATENT DOCUMENTS

| | | |
|---|---|---|
| KR | 10-2009-0085029 | 8/2009 |
| WO | WO0159706 | 8/2001 |
| WO | WO0169936 | 9/2001 |
| WO | WO03069437 | 8/2003 |
| WO | WO2008031039 | 3/2008 |
| WO | WO2008057653 | 5/2008 |
| WO | WO2008092076 | 7/2008 |
| WO | WO2009049053 | 4/2009 |
| WO | WO2009076178 | 6/2009 |

OTHER PUBLICATIONS

U.S. Appl. No. 13/329,057, filed Dec. 16, 2011.
U.S. Appl. No. 12/858,177, filed Aug. 10, 2010; also published on Jul. 14, 2011, Publication No. US-2011-0173345 A1 (listed above).
Zhao, Jian; Applying Digital Watermarking Techniques to Online Multimedia Commerce; Proc. of the Int'l Conference on Imaging Sciences, Systems, and Applications, Las Vegas, Jun. 30-Jul. 3, 1997. 7 pages.
Website Excerpt titled "Announcing Unified Streaming Platform", from www.unified-streaming.com, bearing copyright notice of 2012, indicated as "Press Release—for release on Jul. 9, 2010", downloaded May 25, 2012, 2 pages.
Website Excerpt titled "USP Live", from www.unified-streaming.com, bearing copyright notice of 2012, downloaded May 25, 2012, 3 pages.
Website Excerpt titled "USP CDN" from www.unified-streaming.com, bearing copyright notice of 2012, downloaded May 25, 2012, 3 pages.
Website Excerpt titled "USO VOD" from www.unified-streaming.com, bearing copyright notice of 2012, downloaded May 25, 2012, 3 pages.
Website Excerpt titled "News", from www.unified-streaming.com, bearing copyright notice of 2012, downloaded May 25, 2012, 2 pages.
International Search Report, for counterpart PCT/US2011/065748 mailed on Sep. 20, 2012, 7 pages.
International Preliminary Examination Report, for counterpart PCT/US2011/065748 mailed on Sep. 20, 2012, 5 pages.
KIPO Machine Translation of KR-10-2008-0003961, 19 pages. (Applicant makes no representation as to accuracy or completeness of this machine translation and has not reviewed it for such).
International Search Report for counterpart PCT Application No. PCT/US2010/0045766, mailed on Feb. 21, 2012, 5 pages.
Written Opinion for counterpart PCT Application No. PCT/US2010/0045766, mailed on Feb. 21, 2012, 3 pages.
International Search Report for counterpart PCT Application No. PCT/US2010/062230, mailed on Sep. 30, 2011, 4 pages.
Written Opinion for counterpart PCT Application No. PCT/US2010/062230, mailed Sep. 30, 2011, 3 pages.
International Search Report for counterpart PCT Application No. PCT/US2011/065759, mailed on Aug. 24, 2012, 5 pages.
Written Opinion for counterpart PCT Application No. PCT/US2011/065759, mailed on Aug. 24, 2012, 4 pages.
Zambelli, Alex, IIS Smooth Streaming Technical Overview, Mar. 2009, Microsoft Corporation, pp. 1-17 pages.
Nelson, David M., Smooth Streaming Deployment Guide, Oct. 2009, Microsoft Corporation, 1-70 pages.
U.S. Appl. No. 12/978,447, filed Dec. 24, 2010.
U.S. Appl. No. 12/978,461, filed Dec. 24, 2010.
U.S. Appl. No. 12/978,468, filed Dec. 24, 2010.
U.S. Appl. No. 12/981,676, filed Dec. 30, 2010.
Search Report from the European Patent Office for Application No. EP11849631.4, mailed on May 8, 2014, 6 pages.
U.S. Appl. No. 13/329,057.

* cited by examiner

PROXY SERVER WITH BYTE-BASED INCLUDE INTERPRETER

REFERENCE TO RELATED APPLICATIONS

This application claims the benefit of priority of U.S. Provisional Application No. 61/424,092, filed Dec. 17, 2010, and of U.S. Provisional Application No. 61/555,378, filed Nov. 3, 2011, and of U.S. Provisional Application No. 61/424,482, filed Dec. 17, 2010, and of U.S. Provisional Application No. 61/424,112, filed Dec. 17, 2010. The disclosures of all of the foregoing applications are hereby incorporated by reference in their entireties.

This patent document contains material which is subject to copyright protection. The copyright owner has no objection to the facsimile reproduction by anyone of the patent document or the patent disclosure, as it appears in Patent and Trademark Office patent files or records, but otherwise reserves all copyright rights whatsoever.

BACKGROUND OF THE INVENTION

1. Technical Field

This application relates generally to distributed data processing systems and to the delivery of content over computer networks.

2. Brief Description of the Related Art

Distributed computer systems are well-known in the prior art. One such distributed computer system is a "content delivery network" or "CDN" that is operated and managed by a service provider. The service provider typically provides the content delivery service on behalf of third parties. A "distributed system" of this type typically refers to a collection of autonomous computers linked by a network or networks, together with the software, systems, protocols and techniques designed to facilitate various services, such as content delivery or the support of outsourced site infrastructure. Typically, "content delivery" refers to the storage, caching, or transmission of content, or streaming media or applications on behalf of content providers, and ancillary technologies used therewith including, without limitation, DNS query handling, provisioning, data monitoring and reporting, content targeting, personalization, and business intelligence.

In a known system such as that shown in FIG. 1, a distributed computer system 100 is configured as a content delivery network (CDN) and is assumed to have a set of machines 102a-n distributed around the Internet. Typically, most of the machines are servers located near the edge of the Internet, i.e., at or adjacent end user access networks. A network operations command center (NOCC) 104 may be used to administer and manage operations of the various machines in the system. Third party sites affiliated with content providers, such as web site 106, offload delivery of content (e.g., HTML, embedded page objects, streaming media, software downloads, and the like) to the distributed computer system 100 and, in particular, to the CDN's servers (which sometimes referred to as content servers, or as "edge" servers in light of the possibility that they are located near an "edge" of the Internet). Such content servers may be grouped together into a point of presence (POP) 107.

Typically, content providers offload their content delivery by aliasing (e.g., by a DNS CNAME) given content provider domains or sub-domains to domains that are managed by the service provider's authoritative domain name service. End users that desire such content may be directed to the distributed computer system to obtain that content more reliably and efficiently. Although not shown in detail, the distributed computer system may also include other infrastructure, such as a distributed data collection system 108 that collects usage and other data from the content servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the content servers.

As illustrated in FIG. 2, a given machine 200 in the CDN (sometimes referred to as an "edge machine") comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP proxy 207, a name server 208, a local monitoring process 210, a distributed data collection process 212, and the like. The HTTP proxy 207 (sometimes referred to herein as a global host or "ghost" process) typically includes a manager process for managing a cache and delivery of content from the machine. For streaming media, the machine typically includes one or more media servers, such as a Windows Media Server (WMS) or Flash 2.0 server, as required by the supported media formats.

The machine shown in FIG. 2 may be configured to provide one or more extended content delivery features, preferably on a domain-specific, customer-specific basis, preferably using configuration files that are distributed to the content servers using a configuration system. A given configuration file preferably is XML-based and includes a set of content handling rules and directives that facilitate one or more advanced content handling features. The configuration file may be delivered to the CDN content server via the data transport mechanism. U.S. Pat. No. 7,111,057 illustrates a useful infrastructure for delivering and managing CDN server content control information and this and other content server control information (sometimes referred to as "metadata") can be provisioned by the CDN service provider itself, or (via an extranet or the like) the content provider customer who operates the origin server.

The CDN may include a network storage subsystem (sometimes referred to herein as "NetStorage") which may be located in a network datacenter accessible to the content servers, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

For live streaming delivery, the CDN may include a live delivery subsystem, such as described in U.S. Pat. No. 7,296,082, and U.S. Publication No. 2011/0173345, the disclosures of which are incorporated herein by reference.

There are many cases where, using a distributed computing system such as that described in connection with FIGS. 1-2, it is desirable to be able to serve custom or semi-custom content to individual requesting end-user clients, given generic source content. This need may come from the client (which may need, for example, a particular format in which to consume streaming media) or from the content provider (which may desire, for example, that its content be watermarked with information about the client or user to which the content was delivered, or with other information about the circumstances of the delivery). Further, the nature of such requirements may change over time, for example, as new media formats become popular, or new watermarking techniques are deployed, or entirely new demands arise for providing tailored content.

Hence, there is a need to provide an improved content delivery platform that can delivery custom or semi-custom content at scale and while meeting real-time performance requirements. There is also a need for an extensible system that can handle an increasing number of content delivery demands in an efficient way. The teachings herein address these and other needs that will become apparent in view of this disclosure.

SUMMARY

This disclosure describes, among other things, a functionality which is can be implemented in conjunction with an HTTP proxy server to generate output objects given an input object and certain instructions. The instructions typically define manipulations or actions to be performed on the input data. Such functionality is intended to enable modification of payloads as they are served to a requesting client, allowing a server to easily provide, among other things, custom or semi-custom content given a generic object.

In general, components other than the given server are made responsible for generating the transforming logic—along with, in some cases, binary "diff" information. The server is able to execute the instructions and use the diff information to modify a generic source object. Furthermore, depending on the situation, the inputs (e.g., the generic source object, instructions, etc.) as well as the output of the process may be cached.

For convenience of illustration, in this disclosure this function is called BSI, for Binary-edge-Side Includes, or Binary Server Integration. Details of BSI will be described in subsequent sections.

Hence, in one non-limiting aspect of the invention, there is provided a computer apparatus for delivering content to a client over a computer network. The apparatus has a processor, computer memory, and operating system. It runs an HTTP proxy application that has an output buffer associated therewith. Further, the apparatus has a byte-based interpreter that takes data from one or more sources. The sources typically define a piece of data to be placed in the output buffer as part of the response to the client request. Using one or more actions, the byte-based interpreter instructs the HTTP proxy as to what order, and from which source, to fill the output buffer to generate a response to a client HTTP request.

The one or more sources together with the one or more actions typically exhibit a syntax, which is preferably XML based.

The apparatus may further include a cache, for storing source data or the instructions that specify the sources and actions. This data and instructions may be received from another apparatus (e.g., retrieved at the time of a client request for content) and cached for re-use in responding to other clients.

By way of example, the actions typically define a byte-range, and may include such commands as combine, insert, substitute, and remove. The actions can be associated with a fragment that is stored for re-use in the cache. An action may also exhibit conditional logic. Hence, the byte-based interpreter can parse and sort the actions to be taken, constructing an output buffer to be filled to respond to the client, arranging bytes from one or more sources to fill that buffer.

In another non-limiting aspect of the invention, a computer apparatus has a processor and memory storing instructions for execution by the processor. When executed, they provide a special purpose machine. The special purposes machine receives a client's request for content. It obtains content that is responsive to the request (e.g., which content may be retrieved from an origin server, or from the cache, etc.), the content being made up of binary data. It applies instructions that specify how to order, modify, or replace one or more bytes within the binary data to create output data that represents modified content, and sends the modified content to the client in response to the request.

The instructions are typically obtained from another server in the content delivery network, at the time of the client request, or in anticipation thereof. The instructions may be cached for re-use in responding to requests of other clients.

The subject matter described herein has a wide variety of applications in content delivery, including for example in watermarking and media stream delivery (e.g., converting a stream from one format to another), among others.

As those skilled in the art will recognize, the foregoing description merely refers to examples of the invention. It is not limiting and the teachings hereof may be realized in a variety of systems, methods, apparatus, and non-transitory computer-readable media. It should also be noted that the allocation of functions to different machines is not, as the functions recited herein may be combined or split amongst different machines in a variety of ways.

BRIEF DESCRIPTION OF THE DRAWINGS

The invention will be more fully understood from the following detailed description taken in conjunction with the accompanying drawings, in which.

DETAILED DESCRIPTION

The following description sets forth embodiments of the invention to provide an overall understanding of the principles of the structure, function, manufacture, and use of the methods and apparatus disclosed herein. The systems, methods and apparatus described herein and illustrated in the accompanying drawings are non-limiting examples; the scope of the invention is defined solely by the claims. The features described or illustrated in connection with one exemplary embodiment may be combined with the features of other embodiments. Such modifications and variations are intended to be included within the scope of the present invention. All patents, publications and references cited herein are expressly incorporated herein by reference in their entirety.

Overview

Figure 1:
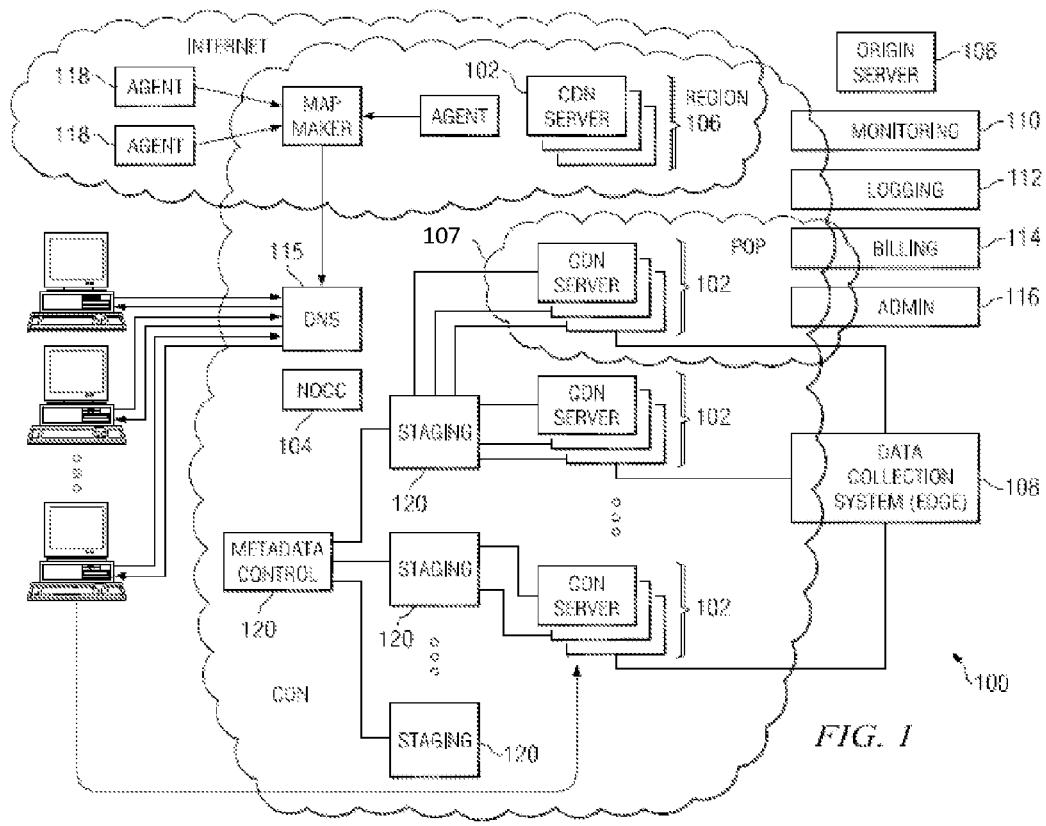
FIG. 1 is a schematic diagram illustrating one embodiment of a known distributed computer system configured as a content delivery network.
Figure 2:
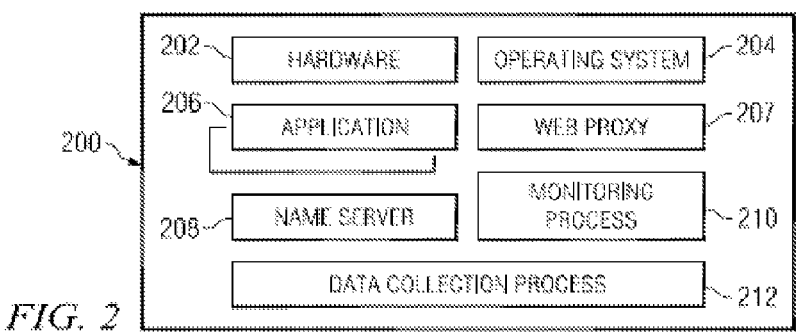
FIG. 2 is a schematic diagram illustrating one embodiment of a machine on which a content delivery server in the system of FIG. 1 can be implemented.

In the context of a distributed computer system for delivering content to end-users such as that shown in FIGS. 1-2, an HTTP proxy in the content server 102 can be extended to include generic functionality that enables modification of payloads as they are served to a requesting client. This functionality allows a content server to easily provide, among other things, custom or semi-custom content at the edge. In an exemplary embodiment, this functionality can be built into the HTTP proxy (ghost) application on the content server, but in other embodiments it might be implemented external to ghost.

Typically, many modifications made by the content server result in a minimal overall change to content, meaning that the resulting data served to the requesting client differs from the input by, for example, only a few percent. In one embodiment, a mechanism is defined for representing the difference (or "diff") between the source(s) and output content, allowing a generic feature in the content server to handle an increasing number of problems in an efficient way.

In general, components other than the content server are made responsible for defining or generating transforming logic and for providing instructions—along with binary "diff" information—that can be understood by the content server. By providing a mechanism for representing the difference (or "diff") between the source(s) and output content, and providing the content server with a way to use these to modify a generic source object, the client-facing content server may handle an increasing number of requests efficiently. Furthermore, depending on the circumstances, the inputs (e.g., the generic source object, instructions, etc.) may be cached. The output of the process also may be cached in some cases.

As noted previously, for convenience of illustration, in this disclosure this function is called BSI, for Binary-edge-Side Includes, or Binary Server Integration. The BSI language, with proposed syntax described below, defines different sources—incoming pieces of data that help construct the final output. Instructions (like 'combine' and others) define the byte ranges and order of how to merge these inputs, as well as controlling output headers. When generated in real-time, the BSI fragment and source object both can be cached (e.g., at the content server), placing far less load on the BSI generation tier than the content server would have handling them directly. For fixed/on-demand applications, the BSI may be generated once, and a BSI fragment cached (e.g., either on the content server, or on network storage or other dedicated storage subsystem).

The BSI approach is ideally very fast. Preferably, the syntax is XML-based, and the number of instructions typically is kept very low, allowing fast parsing. The execution of BSI instructs the content server what order, and from which source, to fill an output buffer that is served to the client.

For convenience of illustration, the discussion below refers to a BSI language and provides various examples of BSI instructions; however, the particular language, instructions, and functions discussed herein should be viewed as illustrative only and not as limiting.

Language

As noted, in one embodiment, the syntax is in XML, which can be advantageous for easy parsing and compatibility with other content server functionality (e.g., control file metadata which may also be implemented in XML).

BSI accepts a definition of one or more sources. Subsequent actions refer to a source id.

| Tag | Type | Description |
| --- | --- | --- |
| bsi:source | Element | Defines a source for later reference by actions. Sample Tag: <bsi:source id="a" type="remote" target="http://origin/path/resource" /> |
| bsi:source.id | Attribute, String | Sets the ID used to reference this source. Preferably starts with a letter, is not case sensitive, and should typically be short (one letter typically). Proposed pattern ^[a-zA-Z][a-zA-Z0-9_]{0-9}$. Preferably there is a way to indicate current buffer as a source, which could be a special/reserved character, or simply by omitting the id. |
| bsi:source.type | Attribute, Enum | Sets the type to one of the following. Remote: a URL to go forward to (as needed by ranges) as a source. Local: A binary blob appended to the BSI response. Offset defined by a header in this case. Inline: The source is binary data that is defined directly in this tag. This could be limited to Base64 or it could be implemented as a format field to define Ascii, base64, hex, etc. In this case the test that defines the source is included in the body of the source tag. |

Actions

Next are actions, which here refer to defined sources by id and instruct on how to order bytes from different sources to build the output that is served. Actions are best structured to make them easy to parse and as succinct as possible. The interpreter is able to parse all needed actions, and to sort them by order of use as the output buffer is created. This keeps the amount of buffered data at a minimum, and it allows short circuiting processing at any point if the client disconnects or an error is encountered.

When possible, use of instructions like combine should be used, as it allows the compiler/interpreter to easily determine the exact order of bytes for the entire output object, serving it without an intermediate buffer.

| Tag | Type | Description |
| --- | --- | --- |
| bsi:combine | Element, list | Defines a list of ranges to include from sources. It defines a list of elements with syntax [Source_ID] : [Byte_Offset] : [Length]. Each element in the list is added to the end of the current buffer. Specifying offset + length, rather than a range, to be more concise. Could also allow exclusion of Source_ID, in which case the previous source is assumed. Byte offsets or lengths can be expressed in decimal or HEX (must begin with 0x or x, more concise for large values), and should handle up to 64 bit integer values (or at *least* 48 bit unsigned). A value of '*' for length would indicate until the end of the source. Sample tag (mix and match ranges from 3 sources): <bsi:combine>[ b:0:0x128, a:68:90, a:92:65043, b:0x124:0x26, c:0:* ]</bsi:combine> |
| bsi:insert | Element | Specifies a list of elements, each one pulling a range from a source and inserting it at an offset into the current buffer - shifting the current buffer to accommodate. It defines a list of elements with syntax: [Source_ID] : [Source_Offset] : [Length] : [Dest_Offset]. If a buffer does not already exist, the Dest_offset must be 0. The length can be * to indicate the remainder of the source, and the dest_offset can be *, indicating that the data is appended to the end of the current buffer. Sample tag (fill buffer with 'a', then insert sections of 'b'): <bsi:insert>[ a:0:*:0, b:0:64:128, b:64:*:*]</bsi:insert> |
| bsi:substitute | Element, list | Similar to Insert, but substitute overwrites the buffer, rather than shifting it. This action works upon the current buffer, and thus requires a buffer to already be built through use of bsi:combine or bsi:insert. It defines a list of elements with syntax: [Source_ID]: [Source_Offset] : [Length] : [Dest_Offset]. Each element defines a byte range to be taken from a source, and overlaid upon a buffer at a certain position - replacing a number of bytes equal to the length. If the length exceeds the current (planned) buffer, then the command would further increase the virtual buffer to be served. The length can be *, indicating the remainder of the source. Sample tag (overwrite portions of buffer with ranges of 'b'): <bsi:substitute>[ b:0:0x128:0x578, b:0x124:0x26:0x2048 ]</bsi:substitute> |
| bsi:remove | Element | Specifies a list of elements, each one removing a range from the current virtual buffer. It defines a list of elements with syntax: [Dest_Offset] : [Length]. The length can be * to indicate the remainder of the dest, and the dest_offset can be negative, indicating to go from the end of the file. Sample tag (remove a few bytes in the middle and then truncate buffer at 256 bytes): <bsi:remove>[ 128:2, 256:* ]</bsi:remove> |

The Insert instruction provides a way to apply a function to a group of bytes that have already been assigned to the output buffer. For example, the instruction might be needed to apply a cipher or hash to bytes that are contiguous in the output, but not in our sources, so a function during an initial combine operation is not useful. One way would be to allow operations to pull from the output buffer, as indicated by a source of *. An optional dest-length parameter on this operation may also be implemented, which would allow writing the result into the same block, but shift the bytes if needed. This would be useful for ciphers that might pad the data. (Because function is already an optional item, it may be needed to distinguish a function, e.g., by prepending $).

1. <!--combine a couple sources.. -->
2. <bsi:combine>[ b:0:0x128, a:68:90, a:92:65043, b:0x124:0x23 ] </bsi:combine>
3. <!--and then apply a function to a sequence in the output buffer -->
4. <bsi:insert>[ *:96:64:96:64:$enc ]</bsi:insert>

Non-Action Commands

These are commands that, unlike actions, do not directly act upon the output buffer.

| Tag | Type | Description |
| --- | --- | --- |
| bsi:set | Element | Sets a value to a target, apart from the output buffer. Sample tag (mix and match ranges from 3 sources): <bsi:combine>[ b:0:0x128, a:68:90, a:92:65043, b:0x124:0x26, c:0:* ]</bsi:combine> |
| bsi:set.target | Attribute, String | Possible values include 'Header' or 'Response Code'. |
| bsi:set.name | Attribute, String | In the case of set target="header", the name of the header to set. |
| bsi:set.value | Attribute, String | The value to set |
| bsi:validate | Element | Provides validation values to compare the output with. Could be useful in some cases, but would likely require buffering the whole file before serving (or else validating only for the purposes of the log) and so may not be efficient in many cases. |

| Tag | Type | Description |
| --- | --- | --- |
| | | Sample tag: <bsi:validate length="67373" md5="d8e8fca2dc0f896fd7cb4cb0031ba249" /> |
| bsi:validate.length | Attribute, Int | Ensure the content length is as-expected before serving |
| bsi:validate.md5 | Attribute, md5 hash | Ensure the buffer md5 matches what is expected before serving. |

Transform Functions

Transforms define functions that can be applied to byte ranges as they are used in other commands.

| Tag | Type | Description |
| --- | --- | --- |
| bsi:transform | Element | Assigns a transform to an ID for later use in actions or upon sources.<br>Sample tag: <bsi:transform id="aes_enc" type="ENC_AES128CBC" parameters="key=123,iv=456" /> |
| bsi:transform.id | Attribute, String | Same rules as IDs for sources, used to later refer to this transform.<br>Sample pattern ^[a-zA-Z][a-zA-Z0-9_]{0-9}$ |
| bsi:transform.type | Attribute, Enum | Selects the supported transform to use. Possibilities include:<br>Encryption/decryption with ciphers such as AES, 3DES, RC4<br>Encoding/decoding with formats base64, url encoding, string encoding (ascii/utf8, etc)<br>Compression; zip, etc.<br>Hash functions; md5, sha1, sha256, CRC, etc.<br>Math functions |
| bsi:transform.parameters | Attribute, String | A list of key/value pairs of parameters as needed by the selected transform, like keys for encryption, etc. |

Other

To support certain use cases, it may be desired to allow metadata variables to be placed in the code. At runtime, the HTTP proxy substitutes these with variables in metadata context. Conditional logic is also important for several uses, but it may impact the very streamlined and easy-to-interpret language described above. To address this, an 'enabled' attribute may be added to each statement, with that attribute then being controlled with ARL metadata variables. The following shows this being used as a sort of IF/ELSE, depending on how the variable % (TEST) evaluates.

1. <!--Do this if 'TEST' evals as true -->
2. <bsi:combine enabled="%(TEST)" >[ b:0:128, a:68:90, a:92:65043 ]
   </bsi:combine>
3. <!--Otherwise, do this instead. -->
4. <bsi:combine enabled="!%(TEST)" >[ b:129:1024, a:68024:2048,
   b:1153:64, c:0:*]</bsi:combine>

In this example, the value of enabled would be evaluated as boolean, accepting 0/1 or true/false, and would also allow '!' to indicate 'NOT'. The metadata variable replacement is done prior to parsing the BSI statements; preferably, any caching of BSI fragments need not include the variable replacements.

Variants

For insert and substitute, there may be an optional syntax that allows the same source data to be injected at multiple points in the destination. Another optimization is a notation that indicates the pattern at which to insert given data, such as:

<bsi:insert>[ a:0:*:0, b:0:64:214(128:10) ... ]</bsi:insert>

In this example, where starting at offset 214, the section of bytes from source b is inserted every 128 bytes, for 10 iterations, and so forth. Such encoding would reduce the size and redundancy in a BSI fragment for certain types of transforms. Or, instead of a mathematical component, the interpreter may operate to simply cause storage of full headers in the diff, but have a repeating statement that has two offsets, which would be very fast. For example, assume the fragment starts at byte 64 of source B, taking 14 bytes for the packet header, and repeats every 14 bytes 200 times, essentially storing each header one after another in the diff. Then, on the destination side place those bytes every 188 bytes—for 200 iterations. This syntax is as follows:

<bsi:insert>[ a:0:*:0, b:64:14(14:200):214(188:200) ]</bsi:insert>

For long running connections, particularly for live media, it may be useful to chain BSI fragments together. A statement at the end of the fragment could instruct ghost the next fragment in the series, which could be retrieved as needed. This would allow a component (e.g., a muxer) to generate a BSI fragment that handles the buffer currently available, and then tell the content server what fragment to use next—likely a time parameter.

```
<bsi:continue fragment="http://origin/fragment.bsi?time=12345" />
```

Example Use Cases

Watermarking Use Case

Watermarking content delivered from the content server is one application of BSI. Watermarking processes typically require integration of application-specific code into the content server. BSI may be used instead.

Like many other use-cases for BSI, in the case of watermarking, the actual modification to output files is generally a very small percentage of the original data, and it can be efficiently represented with BSI instructions for rearranging the original source, or combining it along with a binary object that contained the replacement data.

This is very advantageous, as it allows for much faster integration with a watermarking technique, would not require changes at the content server, and would accommodate modifications to the watermarking scheme with no content server release changes.

In one embodiment, which is non-limiting, each BSI fragment (for example) represents the modifications needed for one unique user, so in many cases thousands of fragments would be needed. In another embodiment, for some watermarking applications the BSI would just contain instructions for rearranging the source content bytes. In others, new unique data may be needed to replace data in the original file (or added to it). In this case, this data could be created in parallel during the pre-processing. Ideally the replacement data set would be fairly small as many unique bytes could be used in different ways by the individual fragments.

In some cases, the replacement data may not be created during pre-processing but rather obtained at request time. For example, the BSI could specify replacement of source data with a piece of information gleaned from the client request, such as a user id, or a client IP address.

It may be desirable to make some transforms (like substitutions for watermarking in particular) optional, so if a source is not available, or based on a condition, the content server would not perform certain actions. This could be done with conditional constructs like if/then or choose/when, or by allowing a tag like bsi:substitute that was optional depending on the availability of the source content.

Figure 3:
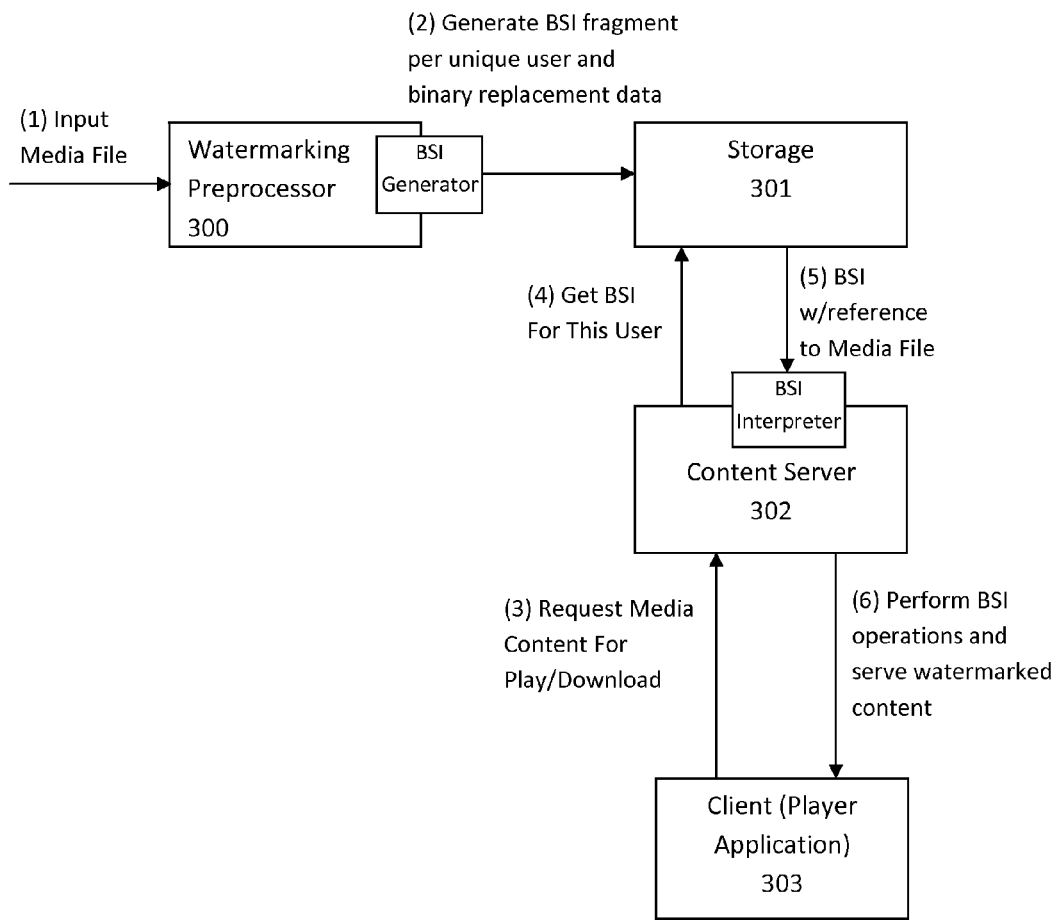
FIG. 3 is a schematic diagram illustrating one embodiment of a workflow using BSI for watermarking media files.

FIG. 3 illustrates one implementation of BSI for watermarking. In step (1), the content provider publishes a media file to a watermarking preprocessor 300. The content may originate from a content provider origin server, an encoder processing a live stream, or otherwise. In some cases, the input media file may originate from Storage 301. In a typical case, the media file is a video or audio file available for consumption by end-users, although it could also be an image or other object that is part of a web page.

In step (2), the watermarking preprocessor 300 generates a BSI fragment for each unique user that is authorized to view the file, which is uploaded to Storage with the content file. There might be hundreds or thousands of fragments depending on the number of expected users. If the watermark requires new unique bytes then the output could also contain a binary replacement data object.

In step (3), an end-user client (typically a player application) requests a media file for progressive play or download. In step (4) the content server requests the appropriate BSI fragment (e.g., keyed by user/watermark ID) from Storage 300, or retrieves it from cache, if available. Storage 300 is typically dedicated storage, such a remote network storage system ("NetStorage"). In step (5), the BSI is sent from the Storage system 300 to the content server 302. The response may be accompanied by the input media file itself, but preferably the response contains a reference to the media file. In step (6), the content server 302 obtains the source media file, e.g., from cache or Storage or an origin server, as appropriate. The content server 302 executes the BSI, modifying the media file per the instruction to create a watermarked media file for the given end user. The content server then serves the media file to the client. The content server preferably caches the BSI for re-use, as well as the input (generic) media file.

Streaming Use Case

In the streaming use case, BSI functionality can be applied between an upstream machine and the content server to streamline the creation of an output object (e.g., media in a format for iPhone or other client device) from an input source (e.g., a media file in a source format). This use case is particularly applicable with live and on-demand streaming platforms, such as those discussed in U.S. application Ser. No. 12/858,177, filed Aug. 17, 2010 (now published as US Publication No. 2011/0173345), and U.S. application Ser. No. 13/329,057, filed Dec. 16, 2011, the contents of both of which are hereby incorporated by reference. Those applications describe, among other things, integrated HTTP-based delivery platforms that provide for the delivery online of HD-video quality content to the most popular runtime environments and to the latest devices in both fixed line and mobile environments. The platforms support delivery of both "live" and "on-demand" content.

Generally, in the streaming use case, an intermediate machine in a streaming platform (such as the SMT machine in above-mentioned U.S. application Ser. No. 13/329,057) receives a stream fragment in one format, be it the original source format, or an intermediate format (IF) used within the streaming platform, as described in the above-mentioned application. The intermediate machine performs muxing steps. Instead of muxed content as output, the intermediate machine creates a dynamic BSI fragment that can be served to the content server, along with a binary object that contains the additional bits that the content server needs to combine with the IF fragment. The content server uses this information to create the muxed output object in the target output format.

Figure 4:
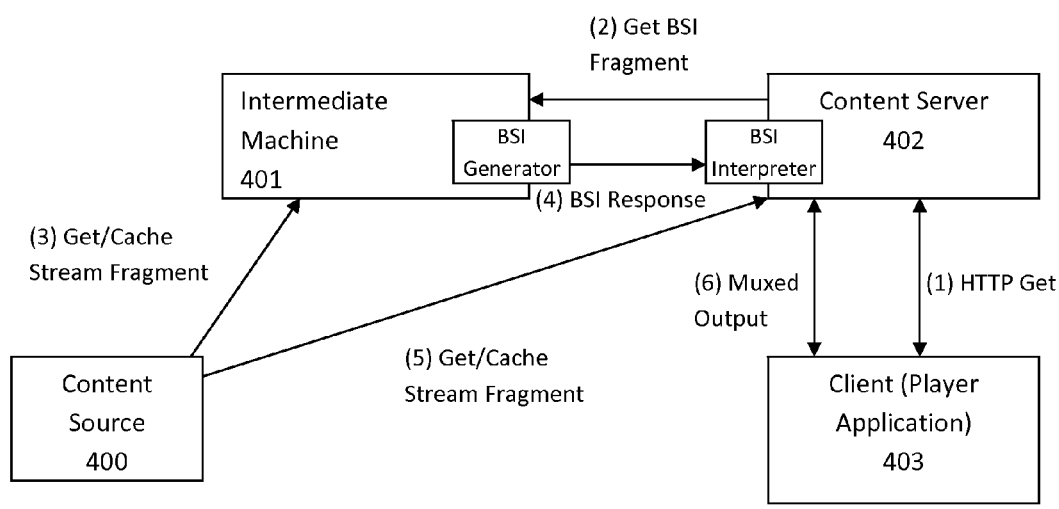
FIG. 4 is a schematic diagram illustrating one embodiment a workflow for using BSI to stream content to a requesting client.

FIG. 4 illustrates an embodiment of the streaming use case in more detail. In this illustrative embodiment, the content server 402 receives a request from a client player 403 for particular content (step 1) in certain target format. The content server makes a request to the muxing tier (the intermediate machine 401) for the BSI required (step 2), or retrieves it from cache if available. Typically, the request includes parameters via query string, to specify the type of request (manifest, content, key file, etc), the bitrate requested, a time determination (fragment no, time offset, etc.), and other parameters related to muxing (segment duration, A/V types, etc.). The intermediate machine 401 obtains the relevant fragments from the Source 400, which may be an encoder, origin server, entrypoint, or storage system (e.g., network storage). The intermediate machine 401 builds an appropriate output object from the stream fragments as if it were to serve the content, creates a buffer of the bytes needed beyond what was contained in the fragments, along with instructions about how to 'interleave' or combine the binary diff with the fragments. In some implementations, it should be understood, any necessary diff data may be embedded directly in the instructions themselves. In step 4, the intermediate machine 401 sends the BSI response to the content server. The response may also include a reference to the fragments that are needed. The content server obtains the fragments in any of variety of ways, including from the intermediate machine 401 (that is, in addition to the BSI), or from the content source 400, or from its own cache. Purely by way of example, step 5 in FIG. 4 shows the fragments arriving from content source 400 and being cached.

As the vast bulk of the data, which is represented by the stream fragment, is cached at the content server, the BSI response with its binary diff typically might be around a few percent of the overall size of the object to be served. The content server 402 applies the BSI, generating and serving a muxed output object to the client (step 6). The BSI response, including both the instructions and the diff data, can be cached by the content server 402 for some period of time. Preferably, the parameters supplied in the request to the intermediate machine 401 (in step 2) are used in the cache key so that only subsequent requests for content with the same parameters utilize the cached BSI response. The output of the BSI operation need not be cached.

The foregoing approach can provide a variety of advantages. Because the BSI instructions can be used tell the content server how to mux or otherwise create the output object, BSI provides a way for the process to support any streaming container format without needing associated code changes at the content server. To handle new container formats or bug fixes to support existing container formats, BSI instructions can change, but the content server logic remains the same. This eliminates any cross-component dependency with the content server when developing or implementing new streaming features.

Further, for streaming to client devices using different container formats, BSI can reduce the cache footprint size because the content server caches the fragments but muxes them into different native formats. Preferably, the muxed output is not cached; rather, only the fragment is cached. For example, the system can be used to stream Adobe Zeri (HTTP Streaming for Flash) to Android devices running Flash 10.1 and stream to MPEG2-TS to iPhone devices. For the live stream, only the generic fragment is cached and the content server muxes into Zeri for Android devices and muxes into MPEG2-TS for IPhone devices. These are just representative examples.

For streaming of progressive-download-style formats (like Shoutcast), data is streamed to client as a long-running unbound HTTP download. From the end user client perspective, it is downloading a file that never ends. BSI functionality can be used for progressive-download-style formats and, in particular, to mux fragment responses from the origin (e.g., a content provider origin or CDN storage subsystem) into a continuous HTTP download stream for the client. Using metadata applied by the content server (configurable by content provider) and progressive-download-style BSI from the SMT, BSI can also be used to implement progressive-download-specific features, like jump-to-live-on-drift and delayed metadata injection based on user-agent. Specific progressive-download-style requirements thus can be inherently supported through BSI without requiring any changes in the content server.

Fragmented output streaming formats (like iPhone®, and Silverlight®) may also use BSI functionality. For example, the intermediate machine 401 can send the content server 402 content in an output format or a BSI fragment that the content server muxes into the output format. Enabling or disabling using BSI is configurable, preferably on a content provider by content provider basis, and, for a given content provider, on a site by site basis, or even a file by file basis.

Encryption Use Case

BSI provides some advantages, but not as many, when used for encryption/decryption or compression/decompression of content. These processes modify every single byte in the data, so any binary diff would be just as large as the content itself. Nevertheless, BSI might be useful in some cases if it had these capabilities as functions. For example, during a BSI transform a decryption step could be applied using the described approach.

Other Use Cases

Another example generic use is to handle changes to other processes, e.g., while a code change is pending to some component involved in the creation or delivery of the content (e.g., encoder, encrypter, content server, origin server). In addition to cases of adding functionality, BSI could be used as a temporary bug-fix that applies a transform to a file to change a behavior while a proper fix was released.

Another use case is transforming a content provider library in a simple way. As one example, some content providers may have media content that is playable, but it would be more efficient if, for example, the moov atom was moved to the front of the file, for faster progressive download. A BSI fragment could express this in a few bytes. For this and other applications, the content delivery system may include a tool that performs a diff on two binary files, and outputs the BSI and binary object needed to transform one into the other.

BSI Examples—the following are non-limiting examples of BSI.

Watermarking

Here is an example for a typical watermarking use case, for progressive download content. A similar process could be done on stream fragments prior to muxing, but would require pre-processing to be done on the stream:

```
1.  <!--assign a source to a progressive DL MP4 file -->
2.  <bsi:source id="a" type="remote"
    target="http://origin/content.mp4" />
3.  <!--assign a source to a file containing replacement data for
    watermarks -->
4.  <bsi:source id="b" type="remote"
    target="http://origin/content.repl" />
5.  <!-- combine the two sources, inserting watermark data into original
    file. -->
6.  <!-- This would typically be a transform every 10-
    60 s of content by playtime, up to 400 or so for a full-length movie. -->
7.  <bsi:combine>
8.  a:0x0:0x10307076c03, b:0xb342c3:0x710c,
9.  a:0x1030707DD0F:0x9d309, b:0x7684b6:0x1a18,
10. ...
11. </bsi:combine>
12. <!--Set content length explicitly, so maybe the HTTP
    proxy doesn't have to use chunked encoding. If not set, chunked
    could be the default. -->
13. <bsi:set target="header" name="Content-Length"
    value="2147483647" />
```

Muxing in a Streaming Platform

Here is an example for muxing that shows the usage of BSI tags:

```
1.  <!--assign a source from a remote file that HTTP proxy will fetch,
    in this case IF. -->
2.  <bsi:source id="a" type="remote"
    target="http://origin/IF_Fragment(time=%(TIME), bitrate=%(
    BITRATE))" />
3.  <!--assign a source from 'local', meaning the binary that is
    appended to this response -->
4.  <!--a header could tell the HTTP
    proxy where the XML response ends, and binary begins, for
    efficiency-->
5.  <bsi:source id="b" type="local" />
6.  <!-- Though not as efficient you could assign a source from inline
    data, say in base64 -->
```

-continued

```
7.   <bsi:source id="c" type="inline"
     >bGxvdy11cCAoc29tZSBhbWJpZ3VpdHkgaGVyZSB3ZSBu
     ZWVkIHRvIGNsZWFu=</bsi:source>
8.   <!-- combine the two sources, by providing a collection with source
     id : byte offset : length -->
9.   <bsi:combine>[ b:0:128, a:68:90, a:92:65043, b:129:1024,
     a:68024:2048, b:1153:64, c:0:* ]</bsi:combine>
10.  <!--optional validate tag would enforce that the content-
     length and hash of output are as expected -->
11.  <bsi:validate length="67373"
     md5="d8e8fca2dc0f896fd7cb4cb0031ba249" />
12.  <!--This kind of thing is done as a function in edge-side-includes,
     rather than a first class tag. -->
13.  <bsi:set target="header" name="Content-Type" value="video/flv" />
14.  <bsi:set target="header" name="Content-Length"
     value="2147483647" />
```

In some use cases like muxing, the BSI and replacement data can be generated dynamically, so the techniques herein also allow the data to be appended to the BSI fragment to prevent needing another roundtrip request. Thus, for example, a header could indicate that a particular binary blob is appended to the BSI code, for easier parsing by the content server:

```
X-BSI-Data: bytes 126-4234\r\n
```

Functions/Transforms
For handling encryption or other transforms inline:

```
1.   <bsi:source id="a" type="remote"
     target="http://origin/IF_Fragment(time=1234567, bitrate=120
     0)" />
2.   <bsi:source id="b" type="local" range="*" />
3.   <bsi:source id="c" type="local" range="*" transform="sha1"/>
4.   <!--
     Content is encrypted, so assign a transform (Functional BSI :) and
     apply it during the combine -->
5.   <bsi:transform id="enc" type="%(CIPHER)"
     parameters="%(CIPHER_KV_PARAMS)" />
6.   <bsi:transform id="sha1" type="HASH_SHA1" />
7.   <!--
     combine the two sources, by providing a collection with source id :
     byte offset : length [ : TRANSFORM ] -->
8.   <bsi:combine>[ b:0:128, a:68:90:$enc, a:92:65043, b:129:1024,
     a:68024:2048, b:1153:64, c:0:* ]</bsi:combine>
9.   <!-- optionally insert ECM and encrypt a portion directly from (and
     back to) output buffer -->
10.  <bsi:insert enabled="!%(ENC_ENABLED)" >[ b:1217:128:512,
     *:512:1024:512:1024:$enc, b:1345:128:2034,
     *:2034:256:2034:256:$enc ]</bsi:insert>
```

Pulling content from the output buffer means that the data must be buffered during BSI processing, as opposed to use of only the combine statement, which would allow the HTTP proxy to continuously flush this data.

Additional Actions

Other methods of manipulating data beyond bsi:combine, like substitute, remove, or insert, that could act upon the current buffer, may be implemented.

```
1.   <bsi:source id="a" type="remote"
     target="http://origin/resource?id" />
2.   <bsi:source id="b" type="remote" target="http://something/else/" />
3.
4.   <!-- in this case we just need to inject something.
     This would act upon the current buffer. -->
5.   <!-- first fill the buffer with a, then insert the contents of b -->
6.   <bsi:insert>[ a:0:*:0, b:0:128:1024 ]</bsi:insert>
7.   <!-- and in this case we need to overwrite bytes, not shift them -->
8.   <bsi:substitute>[ b:128:16:2048 ]</bsi:substitute>
9.   <!--Finally, remove a few bytes -->
10.  <bsi:remove>[ 2048:8 ]</bsi:remove>
```

Computer Based Implementation

The clients, servers, and other devices described herein may be implemented with conventional computer systems, as modified by the teachings hereof, with the functional characteristics described above realized in special-purpose hardware, general-purpose hardware configured by software stored therein for special purposes, or a combination thereof.

Software may include one or several discrete programs. Any given function may comprise part of any given module, process, execution thread, or other such programming construct. Generalizing, each function described above may be implemented as computer code, namely, as a set of computer instructions, executable in one or more processors to provide a special purpose machine. The code may be executed using conventional apparatus—such as a processor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code, such as the "interpreter" referenced above.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 5:
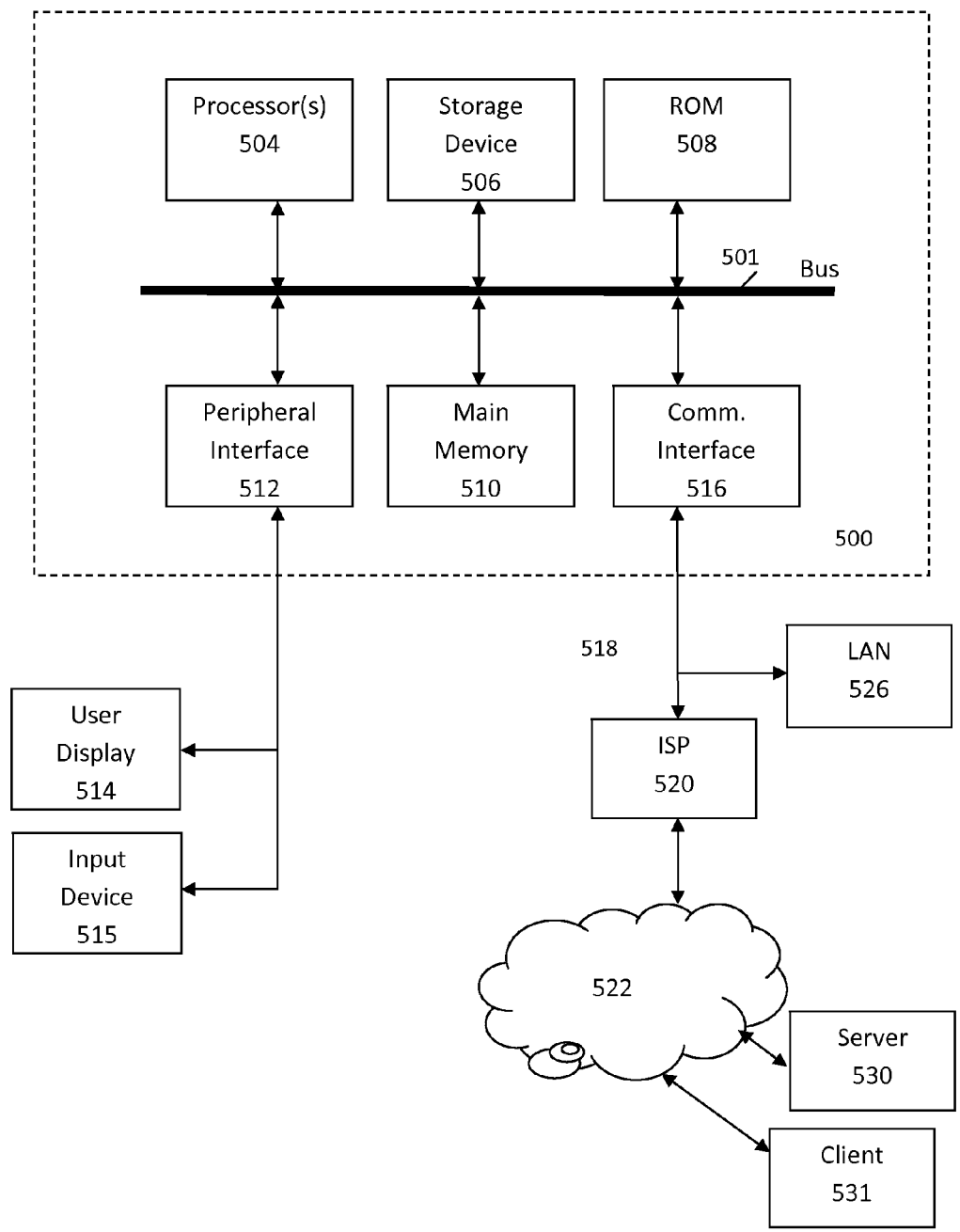
FIG. 5 is a block diagram that illustrates hardware in a computer system which may be used to implement the teachings hereof.

FIG. 5 is a block diagram that illustrates hardware in a computer system 500 upon which such software may run in order to implement embodiments of the invention. The computer system 500 may be embodied in a client device, server, personal computer, workstation, tablet computer, wireless device, mobile device, network device, router, hub, gateway, or other device. Representative machines on which the subject matter herein is provided may be Intel Pentium-based computers running a Linux or Linux-variant operating system and one or more applications to carry out the described functionality.

Computer system 500 includes a processor 504 coupled to bus 501. In some systems, multiple processor and/or processor cores may be employed. Computer system 500 further includes a main memory 510, such as a random access memory (RAM) or other storage device, coupled to the bus 501 for storing information and instructions to be executed by processor 504. A read only memory (ROM) 508 is coupled to the bus 501 for storing information and instructions for processor 504. A non-volatile storage device 506, such as a magnetic disk, solid state memory (e.g., flash memory), or optical disk, is provided and coupled to bus 501 for storing information and instructions. Other application-specific integrated circuits (ASICs), field programmable gate arrays (FP- GAs) or circuitry may be included in the computer system 500 to perform functions described herein.

A peripheral interface 512 communicatively couples computer system 500 to a user display 514 that displays the output of software executing on the computer system, and an input device 515 (e.g., a keyboard, mouse, trackpad, touchscreen) that communicates user input and instructions to the computer system 500. The peripheral interface 512 may include interface circuitry, control and/or level-shifting logic for local buses such as RS-485, Universal Serial Bus (USB), IEEE 1394, or other communication links.

Computer system 500 is coupled to a communication interface 517 that provides a link (e.g., at a physical layer, data link layer, or otherwise) between the system bus 501 and an external communication link. The communication interface 516 provides a network link 518. The communication interface 516 may represent a Ethernet or other network interface card (NIC), a wireless interface, modem, an optical interface, or other kind of input/output interface.

Network link 518 provides data communication through one or more networks to other devices. Such devices include other computer systems that are part of a local area network (LAN) 526. Furthermore, the network link 518 provides a link, via an internet service provider (ISP) 520, to the Internet 522. In turn, the Internet 522 may provide a link to other computing systems such as a remote server 530 and/or a remote client 531. Network link 518 and such networks may transmit data using packet-switched, circuit-switched, or other data-transmission approaches.

In operation, the computer system 500 may implement the functionality described herein as a result of the processor executing code. Such code may be read from or stored on a non-transitory computer-readable medium, such as memory 510, ROM 508, or storage device 506. Other forms of non-transitory computer-readable media include disks, tapes, magnetic media, CD-ROMs, optical media, RAM, PROM, EPROM, and EEPROM. Any other non-transitory computer-readable medium may be employed. Executing code may also be read from network link 518 (e.g., following storage in an interface buffer, local memory, or other circuitry).

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way.

Pursuant to 37 CFR 1.96(b)(2), a computer program listing illustrating an example of a BSI interpreter is included below:

```
#!/usr/bin/env python
# encoding: utf-8
"""
bsi.py : Binary Server Includes (BSI) Interpreter
Copyright (c) 2011 Akamai Technologies. All rights reserved.
"""
import sys, os
import getopt
import xml.sax
import xml.sax.handler
import httplib
import argparse
args = None
class Usage(Exception):
    def __init__(self, msg):
        self.msg = msg
class ErrorHandler:
    def __init__(self, parser):
        self.parser = parser
    def fatalError(self, msg):
        print msg
class Instruction(object):
    def __init__(self, source, start, length):
        self.source = source.strip()
        self.start = int(start)
        self.length = int(length)
    def _repr_(self):
        return self.source + " " + str(self.start) + "-" + str(self.length)
class Source(object):
    target = None
    file = None
    data = None
    def __init__(self, id, type="remote", target=None):
        self.type = type
        self.id = id
        self.target=target
    def _repr_(self):
        return self.type + ": " + str(self.target) + ", " + str(self.file)
class BsiHandler(xml.sax.handler.ContentHandler):
    def __init__(self):
        self.inCombine = 0
        self.inSource = 0
        self.inOther = 0
        self.instructions = [ ]
        self.sources = { }
        self.compile = "."
    def startElement(self, name, attributes):
        #print name + "!"
        if (args.verbose):
            print name,
            for a in attributes.keys( ):
                print ", " + a + "=" + attributes[a].rstrip( ),
            print ""
        self.inOther = 1
        if name == "source":
            self.inSource = 1
            self.inOther = 0
            self.currentSource = Source(attributes["id"], attributes["type"], attributes["target"])
            self.sources[attributes["id"]] = self.currentSource
        if name == "combine":
            self.inCombine = 1
            self.inOther = 0
        else:
            #print (str(self) + ", " + str(name) + ", " + str(attributes), " comp: " + str(self.compile))
            if(self.compile != None):
                if (name=="bsi"):
                    self.compile.write("<bsi")
                else:
                    self.compile.write(" <" + name)#+ ">")
                if len(attributes) > 0:
                    for a in attributes.items( ):
                        self.compile.write(" " + a[0] + "=\"" + a[1] + "\"");
    def characters(self, data):
        if self.inCombine:
            elements = data[1:-1].split(',')
            for element in elements:
                esplit = element.split(':')
                inst = Instruction( esplit[0], esplit[1], esplit[2] )
                self.instructions.append(inst)
        elif self.inSource:
            self.currentSource.data = data
            if(self.compile != None):
                if (data == None or len(data)==0):
                    self.compile.write(" />")
```

```
            else:
                self.compile.write(">")
                self.compile.write(data)
        elif self.inOther:
            self.compile.write(">\n")
            self.inOther = 0
    def endElement(self, name):
        if self.inCombine:
            self.inCombine = 0
        elif self.inSource:
            self.inSource = 0
            if(self.compile != None):
                if(self.currentSource.data == None):
                    self.compile.write(" />\n")
                else:
                    self.compile.write("</" + name + ">\n")
        elif (name != "bsi"):
            if(self.compile != None):
                self.compile.write("</" + name + ">\n")
        #else:
            #if self.inCombine:
def parse (in_file, comp_file):
    if(in_file is httplib.HTTPConnection):
        in_file.request("GET", "in_file")
        r1 = in_file.getresponse( )
        if (args.verbose):
            print r1.status, r1.reason
        data = r1.read( )
        temp.write(data)
        in_file.close( )
        in_file = temp
    if (args.verbose):
        print "Parsing: " + str(in_file)
    parser = xml.sax.make_parser( )
    handler = BsiHandler( )
    handler.compile = comp_file
    parser.setContentHandler(handler)
    parser.setErrorHandler(ErrorHandler(parser))
    parser.parse(in_file)
    return handler.instructions, handler.sources
def get_file(in_file, arg='r'):
    if(arg=='r' and (in_file == "" or in_file==None)):
        return sys.stdin
    try:
        if(in_file.startswith("http") and arg=='r'):
            print "http"
            return httplib.HTTPConnection(in_file)
        else:
            fname = os.path.abspath(in_file)
            if (args.verbose):
                print "File: " + str(fname) + " " + arg
            return open(fname, arg)
    except:
        print "Error opening " + in_file + ", " + str(sys.exc_info( )[0])
        return None
def execute (instructions, sources, output, comp_file):
    for source in sources.values( ):
        if(source.target.startswith("http")):
            source.file = httplib.HTTPConnection(sources[source])
        else:
            f = os.path.abspath(source.target)
            source.file = open(f, 'rb')
    if (output==None or output==""):
        output = sys.stdout
    else:
        output = open(output, 'r+b')
    if (args.verbose):
        for inst in instructions:
            print str(inst) + ",",
        print '\n-----------------------------------'
    if(comp_file != None):
        comp_file.write(" <combine>")
        first = True
    for inst in instructions:
        #get data for this inst.
        data = getData(sources[inst.source].file,inst.start,inst.length)
        #write data to output
        output.write(data)
        if (comp_file):
            if (not first): comp_file.write(",")
            comp_file.write(str(inst.source)
+":"+str(inst.start)+":"+str(inst.length))
            first = False
    if(comp_file != None):
        comp_file.write("</combine>\n</bsi>\n")
        comp_file.close( )
    #close input/output files
    for s in sources.values( ):
        s.file.close( )
    output.close( )
def getData(inp,start,length):
    data = None
    if (inp is httplib.HTTPConnection):
        inp.request("GET", "in_file")
        inp.putheader("Range", str(start) + "-" + str(start + length) + " bytes")
        inp.endheaders( )
        r1 = inp.getresponse( )
        print r1.status, r1.reason
        data = r1.read( )
    else:
        inp.seek(start)
        data = inp.read(length)
    return data
def get_args(argv):
    if argv is None:
        argv = sys.argv
    try:
        parser = argparse.ArgumentParser( )
        parser.add_argument("-i", '--in_file', dest="in_file", help="Input BSI file to process")
        parser.add_argument("-o", '--output', dest="output", help="Output results to file (rather than std_out)")
        parser.add_argument("-c", '--compile', dest="compile", help="Output optimal BSI")
        parser.add_argument("-v", '--verbose', action="store_true", dest="verbose", default=False, help="print status messages to stdout")
        args = parser.parse_args( );
        if (args.verbose): print "Args: " + str(args)
        return args
    except Usage, err:
        print >> sys.stderr, sys.argv[0].split("/")[-1] + ": " + str(err.msg)
        print >> sys.stderr, "\t for help use --help"
        return None
def main(argv=None):
    #get command arguments
    global args
    args = get_args(argv)
    #set up output compiled file
    comp_file = get_file(args.compile, "w")
    #set up input BSI file
    bsi = get_file(args.in_file)
    #parse bsi, compiling instructions and resolving source lisrt
    instructions, sources = parse (bsi, comp_file)
    #execute instructions
    execute (instructions, sources, args.output, comp_file)
if __name__ == "__main__":
    sys.exit(main( ))
```

The invention claimed is:

1. Computer apparatus for delivering content to a client over a computer network, the apparatus comprising:

circuitry forming a processor;

computer memory;

an operating system;

an HTTP proxy that has an output buffer associated therewith; and a byte-based interpreter associated with the HTTP proxy, the byte-based interpreter taking data from one or more sources and, using one or more actions, instructing the HTTP proxy as to what order, and from which source, to fill the output buffer to generate a response to a client HTTP request;

wherein the byte-based interpreter interprets byte-specific instruction that exhibit a syntax of a language an specify the one or more sources and the one or more actions to be taken to fill the output buffer;

and wherein the byte-based instructions interpreted by the byte-based interpreter were retrieved by the apparatus from another apparatus in response to any of (i) the client HTTP request and (ii) a previous client HTTP request to the HTTP proxy.

2. The apparatus as described in claim 1, wherein the syntax is XML-based.

3. The apparatus as described in claim 1, further including a cache for storing source data.

4. The apparatus as described in claim 3, wherein the one or more actions are associated with a fragment that is stored for re-use in the cache.

5. The apparatus as described in claim 1, wherein an action defines a byte range.

6. The apparatus as described in claim 1, wherein an action is at least one of: combine, insert, substitute, and remove.

7. The apparatus as described in claim 1, wherein a source is associated with a piece of data to be placed in the output buffer as part of the response to the client HTTP request.

8. The apparatus as described in claim 1, wherein the byte-based interpreter sorts actions as the response in the output buffer is being constructed.

9. The apparatus as described in claim 1, wherein the byte-based interpreter arranges bytes from the one or more sources.

10. The apparatus as described in claim 1, wherein an action has conditional logic associated therewith.

11. The apparatus as described in claim 1, wherein the byte-based interpreter's instructions to the HTTP proxy cause the HTTP proxy to create watermarked content for delivery to the client.

12. The apparatus as described in claim 1, wherein the apparatus is deployed in a content delivery network operated by a content delivery network service provider.

13. A method for delivering content to a client over a computer network, the method comprising:

with a server that has circuitry forming a processor, computer memory, an operating system, and an HTTP proxy that has an output buffer associated therewith, executing one or more instructions in a byte-based interpreter associated with the HTTP proxy, the byte-based interpreter:

taking data from one or more sources; and using one or more actions, instructing the HTTP proxy as to what order, and from which source, to fill the output buffer to generate a response to a client HTTP request;

wherein the byte-based interpreter interprets byte-specific instructions that exhibit a syntax of a language and specify the one or more sources and the one or more actions to be taken to fill the output buffer;

and wherein the byte-specific instructions that are interpreted by the byte-based interpreter were retrieved by the server from another server in response to any of (i) the client HTTP request and (ii) a previous client HTTP request to the server.

14. The method as described in claim 13, further comprising: caching for re-use any of source data and the one or more instructions.

15. The method as described in claim 13, wherein the syntax is XML-based.

16. The method as described in claim 13, wherein an action is at least one of: combine, insert, substitute, and remove.

17. The method as described in claim 13, wherein a source is associated with a piece of data to be placed in the output buffer as part of the response to the client HTTP request.

18. The method as described in claim 13, wherein the byte-based interpreter arranges bytes from the one or more sources.

19. The method as described in claim 13, wherein an action has conditional logic associated therewith.

20. The method as described in claim 13, wherein the byte-based interpreter's instructions to the HTTP proxy cause the HTTP proxy to create watermarked content for delivery to the client.

* * * * *